United States Patent [19]
Tseng

[11] 3,799,127
[45] Mar. 26, 1974

[54] PISTONLESS ROTARY ENGINE
[75] Inventor: Sheng-Tsai Tseng, Tao Yuan Hsien, Taiwan, China /Taiwan
[73] Assignee: Hwa Te Rotary Engine Company, Taipei, Taiwan, China /Taiwan
[22] Filed: Dec. 2, 1971
[21] Appl. No.: 204,069

[52] U.S. Cl.............................. 123/8.27, 60/39.61
[51] Int. Cl............................................. F02b 53/08
[58] Field of Search............... 60/39.63, 39.61, 39.6, 60/39.62; 123/8.19, 8.25, 8.27, 8.29, 8.31

[56] References Cited
UNITED STATES PATENTS

| | | | |
|---|---|---|---|
| 2,346,646 | 4/1944 | Beech | 123/8.27 |
| 2,172,039 | 9/1939 | Shore | 123/8.27 |
| 2,079,192 | 4/1937 | Upshaw | 123/8.19 |
| 3,076,446 | 2/1963 | Lockhart | 123/8.31 |

*Primary Examiner*—Clarence R. Gordon
*Attorney, Agent, or Firm*—Lane, Aitken, Dunner & Ziems

[57] ABSTRACT

A pistonless rotary engine comprising a generally cylindrical rotor member rotatably disposed in a housing member comprising a pair of symmetrically arranged right and left housing halves. The rotor includes a main shaft member passing through its center and is rotatably journaled in each of the housing halves. The rotor defines at least one chamber set, each of which comprises a compression chamber and an expansion chamber, located on one or both sides of the rotor member. When viewed along the direction of rotation of the rotor for orientation, a mixed gas intake port is provided at the lower end of the frontal portion of the compression chamber. The intake port is in communication with an intake opening in a hollow end of the main shaft. An exhaust port is provided at the rearmost bottom of the expansion chamber and communicates with an opening at the outer circumference of the housing member to exhaust gases from the engine. The housing member defines one or more combination chambers corresponding in number and relative location to the number and relative location of the compression/expansion chamber sets on the rotor. Valve means, including a compression valve and an expansion valve each of which is spring-biased and operated by a valve guide member, are provided for each of the combustion chambers to cooperate with the compression chamber and expansion chamber on the rotor when rotating to provide a thrust to the rotor when the fuel/air gas intake mixture is ignited by a spark plug in the combustion chamber. The compression and expansion valve members are mechanically programmed to extend respectively into the compression chambers and expansion chambers on the rotor to compress the gas mixture in the compression chamber and cause the mixture to pass to the combustion chamber in the housing of the engine, and to control the exhausting of the waste gases from the engine. The compression and expansion valves also cooperate with the intake and exhaust ports in the compression and expansion chambers respectively to control the input of fuel gases and output of waste gases relative to the engine. Sealing means are provided between the housing halves and the rotor to maintain the chamber system in a gas-tight state. Cooling means are also provided for the housing member and the rotor member.

18 Claims, 16 Drawing Figures

PISTONLESS ROTARY ENGINE

BACKGROUND OF THE INVENTION

This invention relates to a pistonless rotary engine. More particularly, this invention relates to a rotary engine comprising a housing member and a rotor member which defines at least a compression chamber and an expansion chamber which cooperate with valves and a combustion chamber in the housing member to produce a rotating combustion engine.

The prior art has developed a number of combustion engines, perhaps the most common of which is the conventional piston-type engine. A piston-type engine is generally either a reciprocating piston engine or a rotary piston engine. The reciprocating piston engine converts the linear motion of the piston in the engine housing into a rotary motion of the crankshaft of the engine through a connecting rod assembly. Because of this conversion, it is quite difficult in reciprocating piston-type engines to maintain the motion of the engine relatively smooth since the vibration of the engine is sometimes quite substantial. In addition, such engines have a deficiency in that their construction is somewhat complicated because of the number of parts necessary to produce a workable reciprocating piston engine. Moreover, such engines are generally quite bulky and occupy a substantial amount of space.

A rotary piston engine transmits the motion of the rotary piston through a set of eccentrically-meshed gears. The number of parts of a rotary piston engine are comparably less and the construction somewhat less complicated than the conventional reciprocating piston engine, while the balance and smoothness of such engines are generally better than reciprocating engines. However, the vibration of the rotary piston engine is still unavoidable due to the eccentric transmission of power through the eccentrically-meshed gears. Thus, it is an aim in the art to produce an efficient engine which is relatively vibration free and occupies a relatively small space.

Either of the two types of piston engines mentioned above is generally air-cooled or water-cooled. In air-cooled engines, the cooling is somewhat ineffective in that the cooling effect is substantially provided on the outside surface of the engine body. Consequently, it is generally quite difficult to cool the interior of the engine body. On the other hand, in a water-cooled engine, the cylinder wall may be somewhat effectively cooled with a surrounding water jacket. However, since auxiliary water tanks, pumps, and forced draft fans are necessary, the complexity, weight, and volume of the engine are substantially increased. Moreover, the effective efficiency of the engine is reduced because of the energy necessary to power the auxiliary water-cooling equipment. Thus, it is an aim in the art to produce an efficient engine which effectively cools a substantial portion of the engine without the need for substantial auxiliary equipment.

Thus, it is a general object of the present invention to provide a novel type of engine comprising a rotor member secured to a shaft rotatably disposed in the housing of the engine and having a basic construction which resembles an electric motor or turbine to provide substantially smooth operation, good balance, and theoretically no vibrations during operation of the engine.

It is an additional object of this invention to provide an engine with an effective cooling means through the use of a cooling fin construction both inside and outside of the engine.

It is an additional object of this invention to provide an air-cooled engine utilizing a cooling fin construction which draws the cooling air into the engine by the fan action of the rotor so that the engine is continuously and effectively cooled.

It is a further object of this invention to provide an effective cooling means for an engine of the type comprising a housing and a rotor member secured in the housing which eliminates the need to add complicated and space-consuming parts to cool the engine.

It is an overall object of the invention to provide a simply-built pistonless engine having a minimum of moving parts.

It is another general object of this invention to provide a pistonless engine which is lighter and less bulky than conventional engines which thus enables easy assembly and disassembly of the engine.

Further objects and features of the present invention will become apparent from a review of the detailed written description of the invention which follows, taken in conjunction with the accompanying drawings.

BRIEF SUMMARY OF THE INVENTION

Directed to overcoming the shortcomings of the prior art and achieving the objects set forth above, the pistonless rotary engine of the invention comprises a housing member and a rotor member secured to a main shaft which is rotatably secured within the housing. In a preferred embodiment, the housing comprises a pair of symmetrically-arranged left and right housing halves. The housing defines at its outer circumference an opening for emitting the exhaust gases from the engine and further defines openings centrally disposed in the housing halves for retaining bearings to support the main shaft of the rotor member. The housing member further defines at least one combustion chamber and valve means including a pair of valve ports respectively accommodating spring-biased compression and expansion valve members at the opposite sides of the combustion chamber. Means are provided to actuate the compression and expansion valves as needed in cooperation with the rotation of the rotor member within the housing during the intake, compression, combustion, and exhaust phases of the combustion cycle of the engine.

The rotor member defines one or more pairs of chamber sets, each of which consists of a compression chamber and an expansion or power chamber located at either or both sides of the rotor. When viewed along the direction of rotation of the rotor for orientation, a fixed gas intake port communicates with each of the compression chambers at the forwardmost bottom portion of the compression chamber. The mixed gas intake port communicates with a channel through an intake opening provided through a hollow end of the main shaft. A waste gas exhaust port is provided at the rearwardmost bottom of the expansion chamber of the rotor which leads through an exhaust opening at the outer circumference of the housing. Where a plurality of chamber sets are provided, a like number of combustion chambers are provided in the housing member corresponding to the number of compression/expansion chamber sets on the rotor member. In each instance, a valve set comprising a compression valve and an expansion valve is provided for each of the combustion chambers.

In operation, the rotation of the rotor member causes the compression chamber to communicate with the combustion chamber which in cooperation with the valve arrangement causes the mixed gas or fuel/air mixture to be drawn into the combustion chamber. Thereafter, the mixed gas intake port is effectively sealed by the action of the compression valve and the intake gases are gradually transferred by the rotation of the rotor from the compression chamber on the rotor into the combustion chamber in the housing where ignition of the intake gases occurs. At the time of ignition, the combustion chamber is effectively sealed by the portion of the rotor which lies between the compression and expansion chambers and by the extension of the compression and expansion valves.

After ignition, the expansion chamber has effectively moved into communication with the combustion chamber by the rotation of the rotor. During this exhaust portion of the cycle, the expanding ignited fuel gases provide a torquing effect to the rotor and the expansion valve precludes the escape of the expanding gases until the torquing effect of the combusted gases has been effectively utilized. Thereafter, the valving arrangement causes the expanded gases to be exhausted through the exhaust opening from the expansion chamber by the operation of the expansion valve.

It is a feature of the engine that the intake and exhaust phases of the combustion cycle effectively continue for substantially the entire portion of rotation of the rotor within the housing. For example, as the rotor member rotates and the intake gases are transferred from the compression chamber to the combustion chamber by the action of the intake valve, the forward portion of the compression chamber begins to receive a new supply of mixed intake gases for combustion during the next combustion phase of the cycle.

Means are provided for cooling the engine. In a preferred embodiment, cooling fins are provided between the central hub and the rim of the rotor member which effectively cool the gas chambers. In addition, cooling fins are provided at the outer circumference of the rotor. Furthermore, cooling fins are provided on the outer surface of the housing to cool the housing.

Means are also provided for sealing the rotor and housing assembly to maintain the chamber system in a gas-tight state.

BRIEF DESCRIPTION OF THE DRAWINGS

In the drawings:

FIG. 2 is a front view of the rotor and housing assembly, partially in section, showing portions of the intake and exhaust channels and part of the combustion chamber relative to the rotor;

FIG. 5 is an end view of the left half of the housing partially cut away to show its interior;

DETAILED DESCRIPTION OF THE PREFERRED EMBODIMENT

Figure 1:
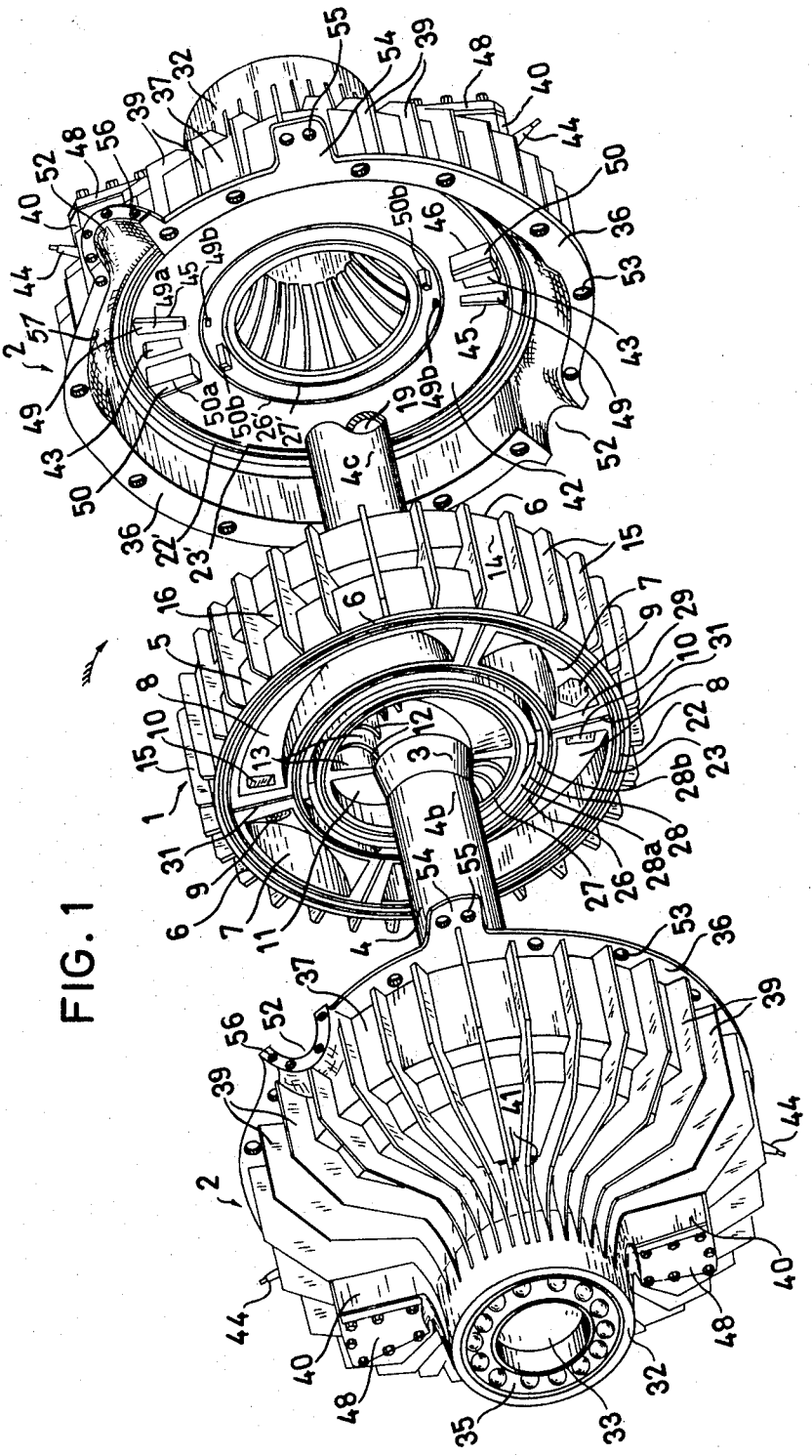
FIG. 1 is an exploded perspective view of the rotary pistonless engine according to the invention showing the rotor member secured to a mainshaft in relation to a pair of engine housing halves which together comprise the engine housing.

FIG. 1 is an exploded view of the pistonless rotary engine according to the invention which comprises a rotor member 1 and a pair of mating engine housing halves which together comprise the engine housing member 2.

The rotor 1 is a substantially cylindrical member having an appropriate axial length to cooperate in a sealed relationship with the housing members 2. A main shaft 4 is preferably formed integrally with a hub 3 through the center of the rotor 1 and extends leftwardly and rightwardly as respectively identified by the reference numerals 4b and 4a. The end 4b of the shaft 4 is solid and serves as the output shaft of the engine while the end 4a of the shaft is hollow and defines an inlet opening for intake gases for reasons to be discussed. The outer circumferential rim 5 of the rotor 1 defines a plurality of ring surfaces 6 on the opposed annular portions thereof which are axially opposite from one another. The cooperation of the ring surfaces 6 in sealing the rotor and the engine housings will be described in greater detail in connection with FIGS. 3 and 5.

The rotor 1 defines pairs of generally fan-shaped chambers 7 and 8 extending radially from the center of the rotor 1 with appropriate spacing therebetween. In one embodiment shown in FIG. 1, two pairs of such chambers are illustrated. The chamber 7 is the compression chamber of the engine and is relatively smaller than chamber 8 which is the expansion chamber or power chamber of the engine. Respective pairs of chambers 7 and 8 may be located on the opposed axially displaced surfaces of the rotor 1, if desired.

When viewed along the rotating direction of the rotor 1 as shown by the arrow, a mixed gas intake port 9 is located at the bottom of the forwardmost end of the compression chamber 7. Similarly, an exhaust port 10 is located at the bottom of the rearwardmost end of the expansion chamber 8. The exhaust port 10 is in communication with and channeled through passage 57 to an opening 52 in the outer circumference of the housing 2. Each of the compression chambers 7 and each of the expansion chambers 8 is similarly constructed and the respective halves of the engine housing 2 define a pair of openings 52 for the exhaust gases from the engine.

In brief, the fuel/air gas mixture is drawn into the engine through the intake port 9 and is compressed and expanded in chambers 7 and 8 respectively. For clarity in terminology, a pair of chambers consisting of a compression chamber 7 and an expansion chamber 8 is referred to in this description as a gas chamber set.

Figure 3:
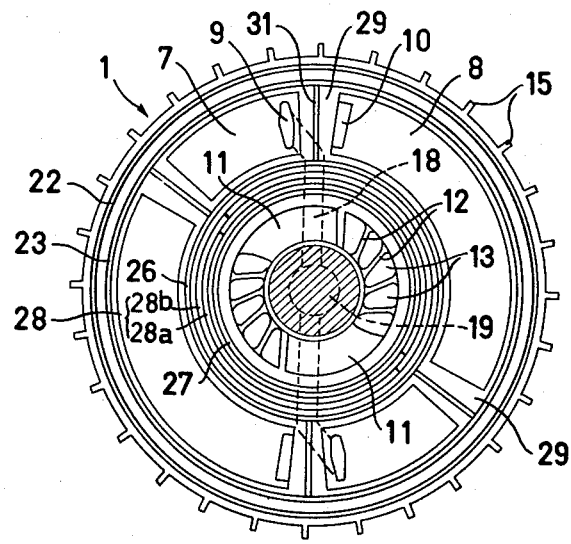
FIG. 3 is a side view of the rotor member, partially in section, showing the means for sealing the rotor within the housing and the means for cooling the rotor member.

As can best be seen in FIGS. 1 and 3, the space between the hub 3 and the rim 5 of the rotor 1 is substantially hollow. A plurality of connectors 11 and cooling fins 12 are formed between the hub 3 and the rim 5 for stability. The spaces identified by the reference numeral 13 between the cooling fins 12 serve as cool air channels for the effective circulation of cooling air through the rotor 1.

Figures 2, 5:
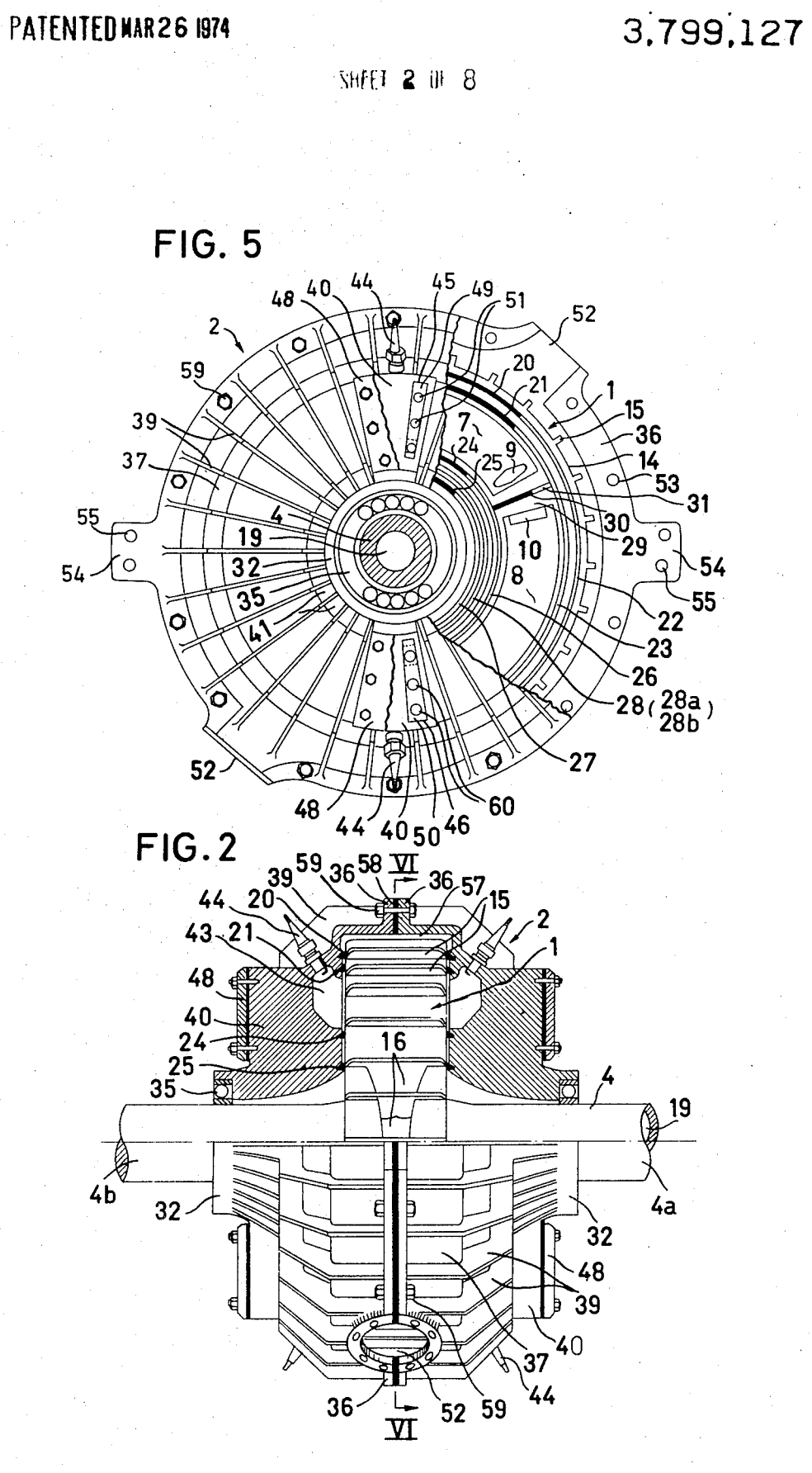

As shown in FIGS. 1, 2, and 3, a plurality of radially extending cooling fins 15 are disposed about the outer circumference 14 of the rotor 1 and are formed integrally with the rotor 1. At the position of the outer circumference 14 of the rotor 1 corresponding to the position of the expansion chamber 8 on the rotor, an exhaust channel 16 is provided for receiving the exhaust gases from the expansion chamber 8.

Figure 7:
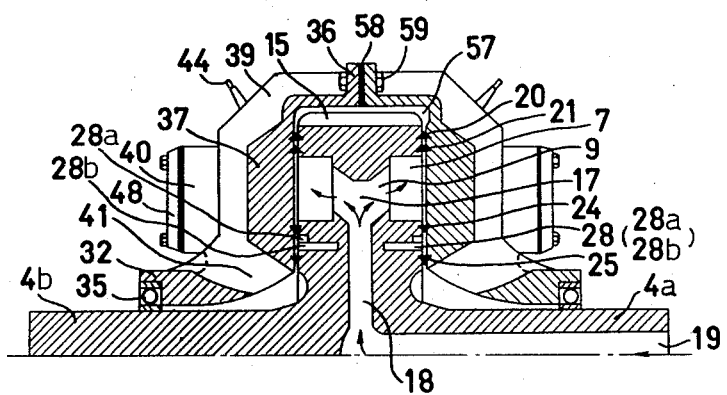
FIGS. 7 and 7a are cross-sectional views of a portion of the housing and rotor assembly taken along the axial direction showing the gas mixture intake channel and the cooling air circulating channel.

As best seen in FIGS. 3 and 7, an intake channel 18 is in communication with the opening 19 in the end 4a of the main shaft 4. The intake channel 18 is provided through the connectors 11 with one end of the channel communicating with the bifurcator 17 defined in the rotor 1 which in turn is in communication with the intake ports 9 of the compression chambers 7. The intake channel 18 thus provides a path for mixed fuel gases from the exterior of the engine through the opening 19 to the compression chambers 7.

The sealing system for sealing the rotor 1 to the housing 2 is best illustrated in FIGS. 1, 3, and 5. A plurality of ring surfaces 6, from the outer circumference 14 of the rotor toward its center, comprise an outer oil ring groove 22 which contains an oil ring 20, an outer pressure ring groove 23 which contains an outer pressure ring 21, an inner pressure ring groove 26 containing an inner pressure ring 24, and an inner oil ring groove 27 containing an inner oil ring 25. A guide groove 28, which consists of an outer groove 28a and an inner groove 28b, is located between the inner grooves 26 and 27 and will be described in greater detail later in connection with the motions of the valves of the engine.

The grooves 31, each of which contains a substantially linear, radially outwardly extending seal 30, are also provided radially on a saddle member 29 which separates the compression chamber 7 from the expansion chamber 8. Thus, the sealing means for the engine comprises a plurality of substantially circular sealing rings, radially separated one from another, and a plurality of radially extending sealing rings arcuately separated one from another.

Figure 4:
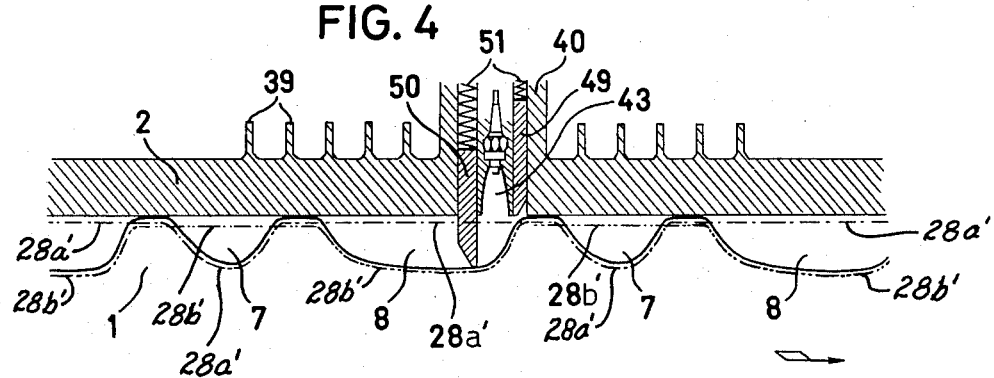
FIG. 4 is a developed view of the relationship between the housing member and the rotor showing the expansion valve extended into the expansion chamber and further showing the successive passage of compression and expansion chamber sets adjacent the combustion chamber in the housing.

The contours of the gas chamber set comprising the compression chamber 7 and the expansion chamber 8 are shown in the developed view of FIG. 4. The direction of rotation of the rotor relative to the housing is indicated by the arrow. The front walls of the chambers 7 and 8 are relatively steeper than the rear portion of the chambers in the direction of rotation of the rotor.

The width of the exhaust channel 16 (as best seen in FIGS. 1 and 2) is shaped so that the channel is narrower in the front and wider at the rear to match the bottom shape of the expansion chambers 8 which are symmetrically arranged on both sides of the rotor 1. This construction provides a relatively evenly distributed side wall thickness to insure balance and smooth rotation of the rotor 1. Similarly, the cooling fins 12 and the connectors 11 are also constructed to match the bottom shapes of the chambers 7 and 8 for the same purposes and may best be seen in FIGS. 1 and 3. The outside surface of the hub 3 is irregularly shaped to facilitate a smooth path for the cooling air.

Figure 6:
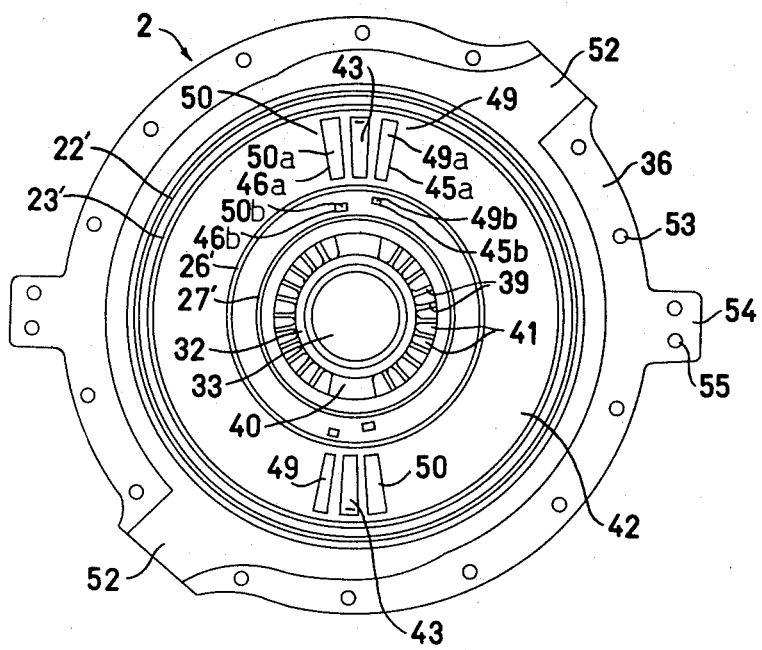
FIG. 6 is a view showing the interior of the housing member.

As may best be seen in FIGS. 5 and 6, the halves of the engine housing 2 are symmetrically bowl-shaped left and right members, each having an opening 33 at the end portion of the neck portion 32 of the hub. Each of the halves of the housing includes a bearing 35 inserted into the opening 33 to retain the rotor shaft 4 in a rotatably secured position. The generally circular portion or ring portion 37 of the housing is provided with a connecting flange 36 which is secured to a like flange on the adjacent housing portion 2 by fastening members 59 (FIGS. 2 and 7).

A plurality of cooling fins 39 are provided about the periphery of each of the housing members 2. The cooling fins 39 extend radially outwardly and extend from the circumferential portion 37 of the housing to the neck portion 32 of the housing. A pair of projecting portions 40 are provided on each of the housing members 2 at approximately diametrically opposed positions. The projecting portions 40 provide chambers for encasing the combustion chamber and valve mechanism which will be described in greater detail hereinafter. A plurality of cooling air intake openings 41 (FIG. 1) are provided in the circumferential portion 37, neck 32, and the fins 39 to draw cold incoming air by suction into the inside of the shaft opening 33 for cooling.

The inside diameter of the circumferential portion 37 of the engine housing 2 is somewhat larger than the outside diameter of the rotor 1. As may be seen in the right housing member in FIG. 1, a ring surface 42 on the interior of the housing 2 is provided about the shaft opening 33. A cavity, hereinafter referred to as the combustion chamber 43, is provided on the surface 42 at a location corresponding to the projecting member 40. The radial length of the chamber 43 is substantially equal to the width of the fan-shaped compression and expansion chambers 7 and 8 on the rotor. A spark plug 44 is inserted into the chamber 43 for igniting the compressed gases in the combustion chamber 43.

Figure 8:
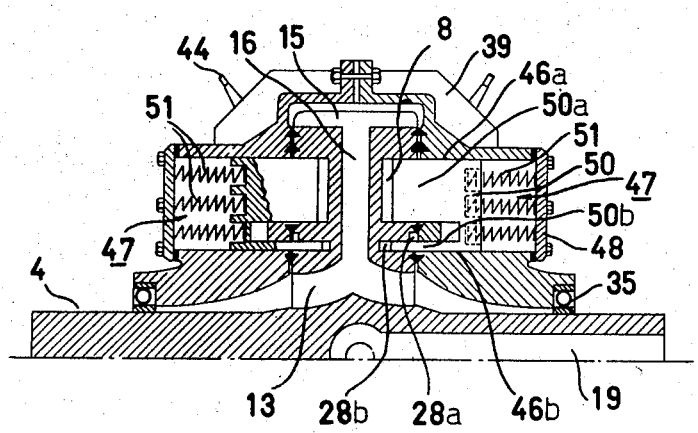
FIG. 8 is a cross-sectional view of a portion of the housing and rotor assembly taken along the axial direction showing the valve means for actuating the valves.

A pair of valve ports 45 and 46 are disposed diametrically opposed to one another relative to the shaft and extend into the projecting portion 40 of the housing 2. The valve mechanism, best seen in FIG. 8 and identified generally by the reference numeral 47, is covered with a cover plate 48 fastened from the outside to the projection 40. The valve mechanism 47 includes a valve body 49a and a valve guide 49b (best seen in FIG. 6) for actuating the compression valve 49 and a valve body 50a and a valve guide 50b for actuating the expansion valve 50. The valves 49 and 50 are constantly biased toward the side of the rotor 1 by the compression springs 51 retained inside the valve ports 45 and 46 as shown in FIG. 8.

The valve port 45 is located at a forward position relative to the port 50 along the rotating direction of the rotor 1 and serves to retain the valve body 49a and the valve guide 49b. The upper portion of the port 40 is further divided into two compartments 45a and 45b which are connected with each other. The compression valve 49 is retained in the compartments 45a and 45b in such a manner that the valve body 49a and the valve guide 49b are slidably mounted in the compartments.

Similarly, the valve port 46 is located at the rearward position along the rotating direction of the rotor 1 and serves similarly to retain the valve body 50a and the valve guide 50b. The upper portion of the port 46 is similarly divided in the compartments 46a and 46b in such a manner that the valve body 50a and the valve guide 50b are slidably mounted in the compartments. The compartments 45b and 46b which retain the valve guides 49b and 50b are located at a radial position corresponding to that of the guide groove 28 on rotor 1 as hereinbefore mentioned. The ring surface 42 of each of the housing members 2 contains sealing grooves 22', 23', 26' and 27' which mate with the sealing grooves 22, 23, 26, and 27 on the rotor 1 described earlier.

As can be seen in FIG. 2, the rotor 1 is suspended within the housing halves 2 so that all of the seals form a gas tight system.

The exhaust channel 52 which is generally circular in cross section, extends from the combustion chamber 43 in the housing 2 along the direction of rotation of the rotor 1 toward the flange 36 on the housing 2. Each of the housing members 2 includes half of the exhaust channel 52. A plurality of openings 53 are provided on the sealing flange 36 for the purpose of fastening together the housing halves 2. Fastening means 59, for example, bolt/nut sets, are provided for fastening the respective halves of the housing 2 about a seal 58 to maintain the engine in a gas tight condition.

FIG. 4 illustrates in a developed view the relationship among the compression chamber 7, the expansion chamber 8 and the guide groove 28 in the rotor 1 which causes the mechanically programmed reciprocating action of the guide valve mechanism.

The illustration of FIG. 4 is provided as a linear extension of the actual circular route of the housing and rotor in which the solid line depicts the route arrangement of the compression chamber 7 and the expansion chamber 8 through one full revolution of the rotor 1. The dashed-dotted line designated by the numeral 28a' depicts the outer guide groove 28a whereby the compression valve body 49 moves along the valve guide 49b. The dashed-double dotted line designated by the numeral 28b' depicts the inner guide groove 28b whereby the expansion valve body 58 moves along the valve guide 50b. As previously explained, the compression valve 49 is actuated by the valve guide 49b cooperating with the outer guide groove 28a while the expansion valve 50 is actuated by the valve guide 50b cooperating with the inner guide groove 28b. The dotted-dashed lines 28a and dotted-double dashed lines 28b' in FIG. 4 show that the compression valve 49 is permitted to extend when the compression chamber is in register with the compression valve 49 and retained in its closed position for other portions of the cycle. Similarly, the expansion valve 50 is permitted to extend into the expansion chamber 8 when the expansion chamber 8 is in register with the expansion valve 50 and is retained in its closed position for other portions of the combustion cycle.

From the diagram in FIG. 4, it is apparent that the compression valve 49 protrudes or extends from the valve port 45 (best seen in FIG. 1) only when the compression chamber 7 enters into its domain and the tip of the compression valve 49 contacts closely against the contour of the body of the compression chamber 7. In the same manner, the expansion valve 50 protrudes or extends from the valve port 46 only when the expansion chamber 8 enters into its domain and the tip of the expansion valve 50 contacts closely against the contour of the bottom of the expansion chamber 8.

Based upon the above embodiment, the principles of operation of the present invention are as follows. Referring to FIG. 7, the fuel or gas mixture supplied from the fuel tank through a carburator (both of which are not shown) is drawn into the opening 19 in the center of the shaft 4 of the rotor 1. The gas mixture is then provided to the bifurcator 17 by the centrifugal force of the rotation of the rotor and enters into the compression chamber 7 of the rotor through the suction or intake port 9. When the rotor 1 rotates and the valve mechanism 47 and the guide groove 29 (and particularly the inner guide groove 28a) relatively coact, causing the compression valve 49 to extend from or protrude from the valve port 45, the gas mixture is received and compressed in the combustion chamber 43 in the housing 2. When the compression chamber 7 reaches a position to be sealed by the saddle member 29 between the compression chamber 7 and the expansion chamber 8, the spark plug 44 is caused to ignite the compressed gas mixture in the combustion chamber 43.

Thereafter, the saddle member 29 leaves the combustion chamber area 43, the area of which, because of the rotation of the rotor 1, is achieving register with the expansion chamber 8. In this condition, the expansion valve 50 protrudes or extends from the valve port 46 into the expansion chamber 8. In this condition, the expansion chamber 8 and the expanding combusted gas is forced from the combustion chamber 7 into the expansion chamber 8 and expands between the expansion chamber 8 and the expansion valve 50. The pressure from the expansion of the combusted gas forces the rotor 1 to move rotatably forward and thus provides a torque to the rotor for rotation. When the rear end of the expansion chamber 8 reaches a position adjacent the expansion valve 50, the valve body 50a retreats into the valve port 46 and the waste gas resulting from the last stage of expansion is exhausted through the port 52. The resultant waste gas is then intermingled with cooling air passing through the exhaust channel 16 to the open atmosphere through a waste gas discharge system (not shown). Upon the completion of the exhaust stroke, the next adjacent compression chamber 7 again reaches the area adjacent to the combustion chamber 43 repeating another cycle of compression, ignition and expansion, and exhaust.

While the rotor 1 rotates, the cooling fins 12 on the interior of the rotor 1 and the cooling fins 15 on the outer periphery of the rotor 1 provide a fan-like effect to introduce cooling air from outside of the housing 2 through the cooling air intake openings 41 in the outer surfaces of the engine housings between the cooling fins 15 as can best be seen in FIG. 1. The cooling air introduced from outside of the housing 2 through the suction opening 41 is introduced into the channel 13 of the rotor 1. The cooling air is then further forced by the centrifugal force caused by the rotation of the rotor 1 through the exhaust channel 16 to the port 57 where the intermingling of the cooling air with the waste gas resulting from the combustion cycle occurs, as mentioned above.

FIGS. 9a through 9f are provided to further clarify the aforementioned principles of operation and to facilitate a more detailed description of the various stages of operation in the combustion cycle of the engine of the invention.

Figure 7A:
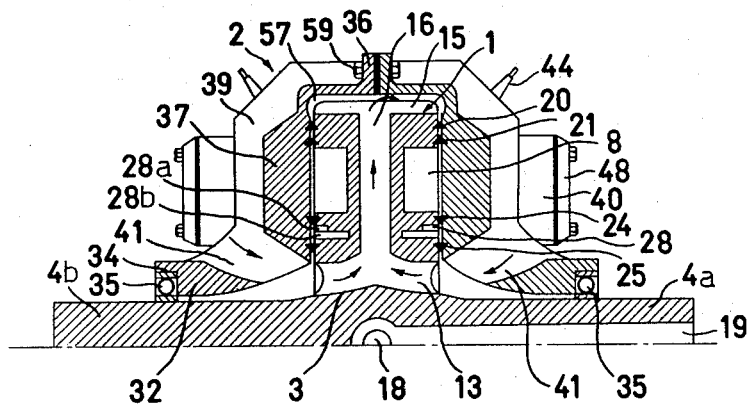
Figure 9A:
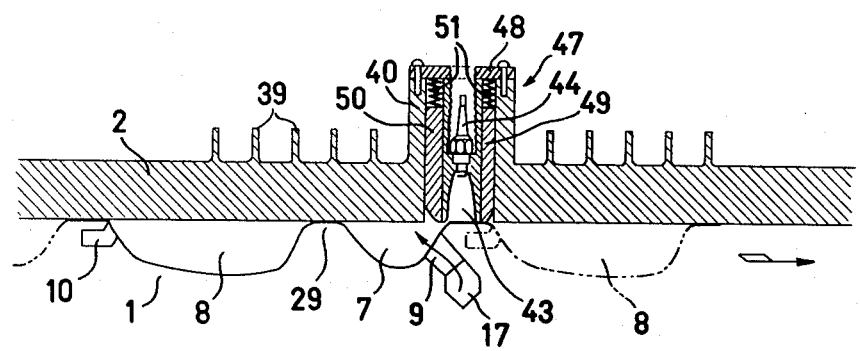
FIGS. 9a–9f are portions of developed views showing the relationship between the valves and the chambers at various times in the rotation of the rotor member relative to the housing.

When the rotor 1 revolves in the direction indicated by the arrow, the intake of the gas mixture is provided through the intake port 9 of the compression chamber 7. The intake port 9 of the compression chamber 7 is located at a fixed angle with respect to the intake opening 19 through the bifurcator 17, as can best be seen in FIGS. 7 and 7a. Thus, FIG. 9a shows the relative positions of the rotor and housing when the compression chamber 7 is ready to be located because of the rotation of the rotor 1 adjacent the area of the combustion chamber 43. Thus, because of the centrifugal force caused by the rotation of the rotor 1, as well as by the pressure difference across the system, the mixed fuel gas is drawn in through the port 9 into the compression chamber 7. The compression valve 49 and the expansion valve 50 have not yet protruded from the housing 2 and are maintained respectively in the valve ports 45 and 46.

Figure 9B:
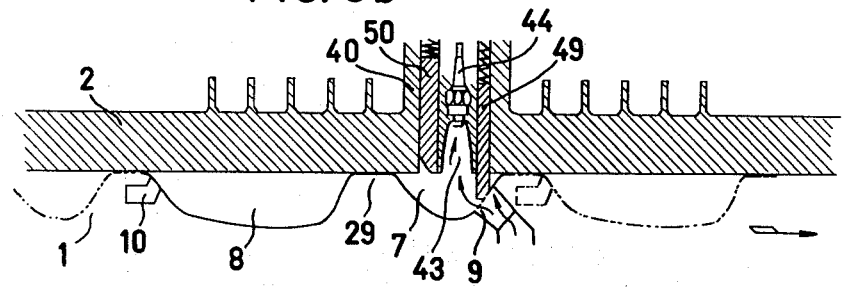

In FIG. 9b, the compression chamber 7 has moved because of the rotation of the rotor 1 into register with the area of the combustion chamber 43. The compression valve 49, with the aid of the valve mechanism and the valve guide groove, protrudes from the port 45 into the compression chamber 7. As the rotor 1 continues to revolve in the direction of the arrow, the compression valve 49 intersects the intake port 9 and separates the compression chamber 7 into a forward portion and a rearward portion. In effect, the compression valve 49 causes the effective volume of the compression chamber 7 to be reduced by the camming action of the tip of the compression valve 49 against the surface of the compression chamber 7. The mixed gas in the compression chamber 7 is thus compressed against the rear wall of the compression chamber by the side surface of the compression valve 49. In FIG. 9b, the compression valve 49 has not yet completely sealed the intake port 9, with the effect that the compression chamber 7 and the combustion chamber 43 are connected while the intake port 9 remains at least partially open to continue to provide an intake for the gas mixture as indicated by the arrows.

Figure 9C:
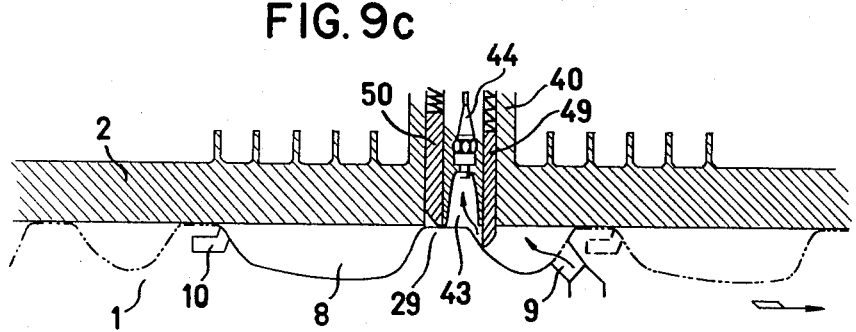

In FIG. 9c, after the compression valve 49 has completely passed beyond the intake port 9, the continuing advancement of the rotor 1 enables the compression valve 49 to force the gas mixture into the rear portion of the compression chamber 7 and thus into the combustion chamber 43.

In the meantime, the front portion of the compression chamber is effectively enlarged by the coaction of the compression valve 49 and the contour of the chamber 7 and continues to be filled with the gas mixture from the intake port 9, thus beginning the intake stroke of the next cycle. When the compressed gas is thoroughly shifted into the combustion chamber 43 at the point that the saddle portion 29 of the rotor 1 moves into a position adjacent the compression valve 49, the compression valve 49 has thus been caused to retract into the port 45. Thus, the combustion chamber 43 at this point in the cycle has also been closed by the saddle portion 29, and the spark plug 44 is caused to ignite the gas which, in turn, combusts and expands in the combustion chamber 43.

The continued rotation of the rotor 1 causes the saddle portion 29 to leave the area of the combustion chamber 43. Thereafter, the expansion chamber 8 follows immediately into a position adjacent to the area of the combustion chamber 43 and the expansion chamber 8 and descends along the bottom surface of the expansion chamber 8, separating the expansion chamber into a forward and a rearward portion. This operation also shuts off the route of the expanding gas leading to the exhaust port 10.

Figure 9D:
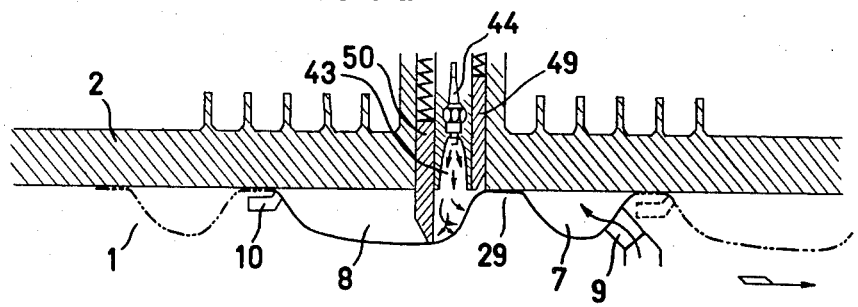
Figure 9E:
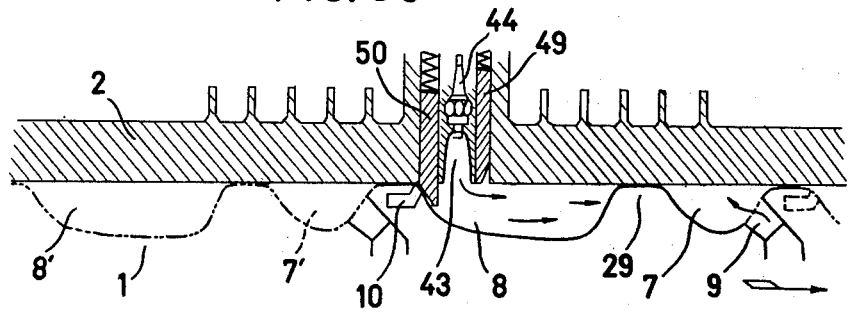

As shown in FIG. 9d, the combusted gas in the chamber 43 pushes against the front wall of the expansion chamber 8 and provides the rotor 1 with a torquing force sufficient to continue to cause the forward revolution of the rotor 1. When the rotor 1 continues to revolve under the impetus of the expanding gas from the expansion chamber, the forward portion of the expansion chamber 8 is gradually enlarged and the rearward portion relatively diminished until the forward and rearward portion are again resolved into a single expansion chamber 8 as shown in FIG. 9e. The remaining waste gas from the previous cycle is expelled by the action of the expansion valve 50 through the exhaust port 10.

FIG. 9e shows the expansion chamber 8 as the valve 50 is restored to its initial position in the valve port. As seen in FIG. 9e, the exhaust port 10 is still effectively sealed by the tip of the expansion valve 50 while the expanding gas reaches its maximum expansive state. As the portion between the expansion chamber 8 and the next adjacent compression chamber 7' coacts with the expansion valve 50, the expansion valve 50 retracts into the valve port 46 and the exhaust port 10 is open to permit the waste gas to escape from the expansion chamber 8.

Figure 9F:
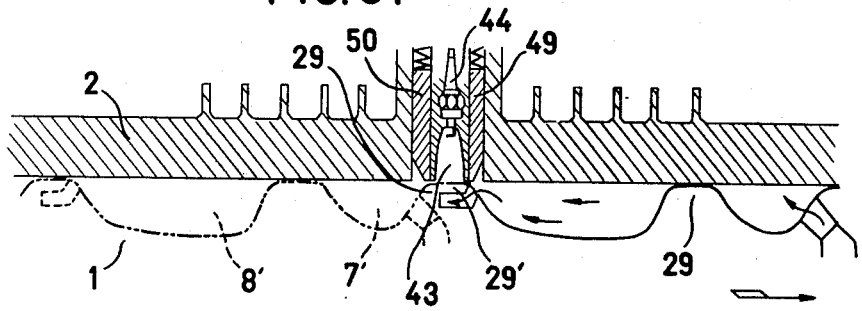

As shown in FIG. 9f, another saddle portion 29' separating the expansion chamber 8 and the next adjacent compression chamber 7' closes the combustion chamber 43. At this point in the cycle, the exhaust stroke of the expansion chamber 8 and the suction stroke of the compression chamber 7' are continuing. The relatively small amount of residual gas remaining in the combustion chamber 43 may be scavenged therefrom by a device which opens an opening (not shown) on the saddle portion 29. The residual gas in the combustion chamber 43 is scavenged by drawing in some additional fresh air through that opening. After the completion of the scavenging action, the saddle portion 29' departs from the combustion chamber area by the rotation of the rotor and the compression chamber 7' starts another cycle, to repeat the action shown from FIGS. 9a through 9f. The relationships between the compression and expansion cycles, as well as the suction, exhaust and the scavenging cycles, are shown in FIG. 10 for various strokes of the engine of the present invention.

Figure 10:
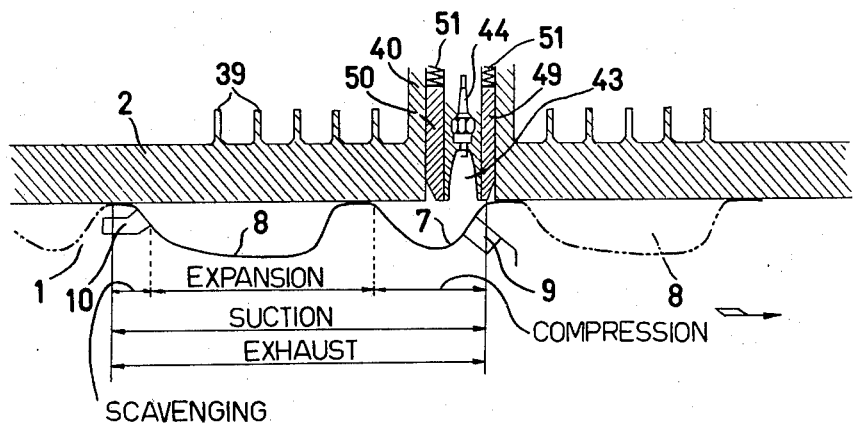
FIG. 10 is a diagram relating to various segments of the combustion cycle of the engine to the rotation of the rotor member relative to the housing.

Thus, the manner in which the gas chamber set of one compression chamber and one expansion chamber complete the entire cycle of suction, compression, combustion and exhaust, including the scavenging stroke, and the relations thereof are apparent from FIG. 10, in view of the discussion of FIG. 9 above. From FIG. 10, it can be seen that the suction stroke and the exhaust stroke of the engine of the present invention are completed simultaneously and each occupies substantially the entire cycle time, while the compression stroke and the expansion stroke, the latter of which may include scavenging, together occupy relatively the same length of cycle time. Thus, the entire time required to complete the conventional four strokes of a cycle takes only the length of time covered by the compression and expansion strokes.

In the present embodiment, the gas chamber sets are arranged so that the rotor is provided with a pair of action surfaces including two sets of gas chambers and two sets of combustion chambers and valves are provided on each housing half. Thus, with one revolution of the rotor, each gas chamber set participates in two ignition and expansion cycles and gives the rotor shaft the effect of a conventional four stroke cycle. Since there are two sets of gas chambers on each surface of the rotor, one revolution of the rotor gives each surface four ignitions and two surfaces give a total of eight ignitions. With such an effect, taking the conventional two stroke or four stroke reciprocating piston engine for comparison, not only are the working times per unit revolution of the rotor shaft several fold greater than the conventional working times of four stroke piston engines, the effective working angle from one explosion in one cycle occupies almost two-thirds of the total cycle. Therefore, the efficiency is very much higher than that of a conventional reciprocating engine or rotary piston engine. Moreover, as explained above, the cooperation of the parts causes a relatively non-vibrating operation because of the absence of a main shaft and camming shaft structure.

By way of completeness of disclosure, the rotor surface may be made a single surface rather than a double surface, and one set of gas chambers could be installed on each surface. In addition, multiple gas surfaces could be installed on each surface to provide accordingly with one or more combustion chambers and valve sets. Still further, the gas chamber sets may be arranged on concentric circles or at different radial distances from the center of the rotor, or could be provided on the circumference of the rotor if desired.

When two surfaces of the rotor are utilized, allocation of the gas chamber sets on different surfaces may be coincidal, crosswise, or overlapping so far as the balance of the rotor may be achieved. Still further, the guide groove for the valve mechanism could be shifted to the outside ring portion of the rotor so that the compression ratio of the gas mixture may be raised. In addition, the spark plug could be changed into an injection nozzle to alter the engine into a diesel engine. Thus, it is apparent that modifications other than the present embodiment are possible for those skilled in the art without departure from the spirit of the present invention, as set forth above. Therefore, the present embodiment serves only as an example for illustration and is not intended to limit the scope of the present invention defined by the claims appended thereto.

What is claimed is:

1. A pistonless rotary engine comprising:

a housing defining at least a portion of a combustion chamber;

a generally cylindrical rotor member, including a main shaft, rotatably secured in and cooperating with said housing to define at least one rotating chamber set including a contoured compression chamber and a contoured expansion chamber, said compression chamber including fuel intake means located near the forward portion of said compression chamber in the direction of rotation of said rotor member for receiving a combustible fuel from a source external to said chamber, said expansion chamber including first exhaust means located near the rearward portion of said expansion chamber in the direction of rotation of said rotor member for exhausting combusted fuel from said expansion chamber, said fuel intake means and said first exhaust means being rotatable with said rotor member;

fuel supply means for providing said combustible fuel from said source to said fuel intake means;

ignition means operatively associated with said combustion chamber to ignite a fuel mixture contained therein;

second exhaust means for exhausting combusted fuel from said first exhaust means to the exterior of said engine;

valve means on said housing cooperating with said rotor member to define said combustion chamber, and said compression chamber and said expansion chamber respectively to cause the combustible fuel in said compression chamber to be compressed, to cause the compressed gases to be contained for combustion within said defined combustion chamber, and to cause said combusted gases to be exhausted from said expansion chamber through said first exhaust means, said valve means being programmed to operate upon rotation of said rotor;

said valve means including a compression valve located forward of said combustion chamber relative to the direction of rotation of said rotor member and an expansion valve located rearward of said combustion chamber relative to the direction of rotation of said rotor member, said compression valve operating only relative to said compression chamber to compress said fuel mixture in said compression chamber, both said compression valve and said expansion valve operating to define at least a portion of said combustion chamber during ignition of said fuel in said combustion chamber and said expansion valve operating only relative to said expansion chamber to cause the expanding combusted fuel to provide an impetus to said expansion chamber on rotor member; and means for sealing said rotor and said housing to provide a gas-tight engine.

2. The engine as set forth in claim 1 wherein said main shaft passes through the center of said rotor, said housing member defining a pair of openings axially in register for receiving said main shaft, and bearing means in said openings for rotatably journaling said main shaft in said openings.

3. The engine as set forth in claim 1 wherein said rotor member defines a plurality of said rotating chamber sets.

4. The engine as set forth in claim 3 wherein said rotating chamber sets are located in the axially opposed surfaces of said rotor member.

5. The engine as set forth in claim 1 wherein said fuel intake means includes an intake port located at the lower portion of the forwardmost portion of the compression chamber when viewed in the direction of rotation of said rotor in said housing, said fuel supply means including an intake channel, said intake port being in communication through said intake channel with a source of combustible fuel exterior to said engine.

6. The engine as set forth in claim 5 wherein said intake channel includes an opening in said shaft, and said fuel supply means includes channel means in said rotor member which communicate with said opening in said shaft and said intake port.

7. The engine as set forth in claim 1 wherein said first exhaust means includes an exhaust port located at the lower portion of the rearwardmost portion of the expansion chamber when viewed in the direction of rotation of said rotor in said housing.

8. The engine as set forth in claim 7 wherein said second exhaust means includes an exhaust channel in said housing, and said exhaust port is in communication with said exhaust channel.

9. The engine as set forth in claim 1 further including means for cooling said engine.

10. The engine as set forth in claim 9, wherein said cooling means includes cooling fins provided between a central hub and a rim of the rotor where said chamber sets are located and cooling fins provided at the outer circumference of the rotor member.

11. The engine as set forth in claim 1 wherein said sealing means includes sealing rings provided between said housing and said rotor member.

12. The engine as set forth in claim 11 wherein said sealing means further includes a plurality of radially extending sealing rings located between said compression chamber and said expansion chamber.

13. The engine as set forth in claim 1 wherein said valve means are operative in response to a valve guide groove located on said rotor.

14. The engine as set forth in claim 13 wherein the compression and expansion valves are actuated by compressed spring means.

15. The engine as set forth with claim 14 wherein the housing defines neck and ring portions connected by a projecting member which contains said valves, and wherein cooling fins are located between the neck portion and the ring portion.

16. The engine as set forth in claim 15, wherein cooling air intake means are provided between the neck portion and ring portion of the housing.

17. The engine as set forth in claim 1, wherein said ignition means includes a spark plug inserted into the said combustion chamber from said housing for the purpose of igniting the compressed combustible gases therein.

18. The engine in accordance with claim 1, wherein said chamber sets are provided at both sides of the rotor so that the position of the chamber at one side of said rotor is in an overlapped or a diagonal relationship with the position of the chamber at the other side of said rotor.

* * * * *